US006322879B1

(12) United States Patent
Stewart et al.

(10) Patent No.: US 6,322,879 B1
(45) Date of Patent: Nov. 27, 2001

(54) PROTECTING METAL FROM CARBON

(75) Inventors: Ronald L. Stewart, Elmira; Tinghong Tao, Big Flats, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/413,709

(22) Filed: Oct. 6, 1999

(51) Int. Cl.$^{7}$ .............................. B32B 15/04; B05D 3/02

(52) U.S. Cl. .......................... 428/212; 428/457; 428/469; 428/472; 428/615; 428/655; 427/372.2; 427/376.2; 427/419.2; 427/419.3

(58) Field of Search .................................... 428/212, 457, 428/469, 472, 615, 655; 427/372.2, 375, 376.1, 376.2, 376.3, 376.4, 419.1, 419.2, 419.3, 419.4

(56) References Cited

U.S. PATENT DOCUMENTS

| | | | |
|---|---|---|---|
| 3,597,241 | 8/1971 | Perugini et al. | 106/1 |
| 3,719,519 | 3/1973 | Perugini | 117/71 |
| 3,936,287 | 2/1976 | Beall et al. | 65/30 |
| 4,724,064 | 2/1988 | Reid | 208/48 |
| 4,997,698 | 3/1991 | Oboodi et al. | 428/209 |
| 5,250,360 | 10/1993 | Andrus et al. | 428/471 |
| 5,807,616 | 9/1998 | Trotter, Jr. | 428/34.4 |

FOREIGN PATENT DOCUMENTS

| | | | |
|---|---|---|---|
| 0 608 081 | 8/1998 | (EP) | C23C/16/40 |
| 1199483 | 7/1970 | (GB) | B44D/1/34 |
| 1604604 | 12/1981 | (GB) | C09D/5/08 |

OTHER PUBLICATIONS

Ruckenstein, Eli and Hu, Yunhang, Appl. Catal. A: 154(1997), pp. 185–205. No month.

Chen, Ping, Zhang, Hongbin, Lin, Guodong and Tsai, Kirui, Appl. Catal. A: 166(1998), pp. 343–350. No month.

Nakayama, Tomohiro, Tamashiro, Keika, Sato, Satoshi, and Nozaki, Fumio, Appl. Catal. A: 151(1997), 437–442. No month.

Nakayama, Tomohiro, Ichikuni, Nobuyki, Sato, Satoshi, and Nozaki, Fumio, Appl. Catal. A: 158(1997), pp. 185–199. No month.

*Primary Examiner*—Deborah Jones
*Assistant Examiner*—Jason Savage
(74) *Attorney, Agent, or Firm*—Milton M. Peterson

(57) ABSTRACT

A method of protecting metal bodies, such as components of a thermal cracking furnace, against formation of carbon deposits, and the furnace components so protected, the method comprising producing an adherent, seamless coat on the metal surface, the coating comprising a layer of combined metal oxides within the $MgO.Cr_2O_3$ system.

24 Claims, 2 Drawing Sheets

PROTECTING METAL FROM CARBON

FIELD OF THE INVENTION

A method of protecting metal bodies, such as components of a thermal cracking furnace, a chemical reactor vessel, or a chemical processing tube, against carburization, corrosion, and formation of carbon deposits, and the metal components so protected.

BACKGROUND OF THE INVENTION

The invention is basically concerned with protecting the surface of a metal body against the deposition of carbon on that surface, and against the detrimental effects that result from such carbon deposition. Protection of the components of a furnace employed in the thermal cracking of hydrocarbons such as ethane, propane, butane, naphtha, or gas oil, to form olefins, such as ethylene, propylene, or butenes, is a specific area of concern. The invention is directed at avoiding, or at least lessening, the formation of carbon deposits, commonly referred to as coke, on the furnace components, such as the wall of a reactor tube, during a thermal cracking process. Therefore, the invention is described in terms of this particular utility, although its wider application will be apparent.

At the heart of a thermal cracking process is the pyrolysis furnace. This furnace comprises a fire box through which runs an array of tubing. This array may be a set of straight tubing fed from a manifold, but frequently is a serpentine array of tubing. In either case, the array is composed of lengths of tubing and fittings that may total several hundred meters in length. The array of tubing is heated to a carefully monitored temperature by the fire box. A stream of feedstock is forced through the heated tubing under pressure and at a high velocity, and the product is quenched as it exits. For olefin production, the feedstock is frequently diluted with steam. The mixture is passed through the tubing array which is commonly operated at a temperature greater than 650° C. During this passage, a carbonaceous residue is formed and deposits on the tube walls and fittings.

Initially, carbon residue appears in a fibrous form on the walls. It is thought this results from a catalytic action, primarily due to nickel and iron in the tube metal. The carbon fibers on the tube wall appear to form a mat by trapping pyrolitic coke particles formed in the gas stream. This leads to buildup of a dense, coke deposit on the walls of the tubing and fittings.

The problem of carbon deposits forming during the thermal cracking of hydrocarbons is one of long standing. It results in restricted flow of the gaseous stream of reaction material. It also reduces heat transfer through the tube wall to the gaseous stream. The temperature to which the tube is heated must then be raised to maintain a constant temperature in the stream flowing through the tube. This not only reduces process efficiency, but ultimately requires a temperature too high for equipment viability. Also, meeting safety requirements comes into question. This may be due to an embrittling, carburization reaction between carbon and the tube metal, or to a catastrophic, metal softening. A shutdown is therefore periodically necessary to remove the carbon formation, a process known as decoking.

Numerous solutions to the problem of coking have been proposed. One such solution involves producing metal alloys having special compositions. Another proposed solution involves coating the interior wall of the tubing with a silicon-containing coating, such as silica, silicon carbide, or silicon nitride. In still other proposals, the interior wall of the tubing is treated with a chromium and/or an aluminum compound. A practice of incorporating additives, such as organic sulfur and phosphorus compounds, in the feedstock stream in attempts to passivate the tube metal surfaces has also been used in commercial processes.

Despite this intensive effort, the industry still faces the problem created by carbon deposition on the high temperature, tube metals. It is then a basic purpose of the present invention to provide a method of avoiding formation of carbon deposits on such metal surface.

A further purpose is to provide an improved material to inhibit coke deposition on a metal surface.

Another purpose is to provide a coated component for a thermal cracking furnace that resists carbon deposition during a thermal cracking process.

A still further purpose is to provide a method of inhibiting the deposition of carbons on a furnace component during a thermal cracking process.

Still another purpose is to provide a coating on the exposed surface of a furnace component to inhibit coke deposition on the component during a thermal cracking process.

SUMMARY OF THE INVENTION

The invention resides, in part, in a method of protecting a metal surface against deposition of carbon on the surface, the method comprising producing an adherent, seamless coating on the metal surface, the coating comprising a layer of combined metal oxides within the $MgO.Cr_2O_3$ system.

The invention further resides in a method of at least lessening the tendency for carbon to deposit, in particular inhibiting formation of catalytic, fibrous carbon, on a metal surface when that surface is exposed, while heated, to a gaseous stream containing hydrocarbons during a thermal cracking process, the method comprising forming a thin, adherent, seamless coating on the metal surface prior to heating that surface and then contacting the coated surface with the hot, gaseous stream, the coating comprising a layer of combined metal oxides within the $MgO.Cr_2O_3$ system.

The invention also resides in a furnace element for insertion in a furnace for thermally cracking or reforming hydrocarbons, the furnace element having an adherent, seamless coating, the coating comprising a layer of combined metal oxides within the $MgO.Cr_2O_3$ system.

BRIEF DESCRIPTION OF THE INVENTION

The present invention is concerned with protecting a metal surface from carbon layer buildup, a condition commonly referred to as coking, and from consequent embrittlement of the metal by carburization. It is particularly concerned with protecting the components in a hydrocarbon cracking furnace from such conditions. Accordingly, the invention is described with respect to that specific utility, but the broader application will be apparent to those concerned with metal protection.

Figure 1:
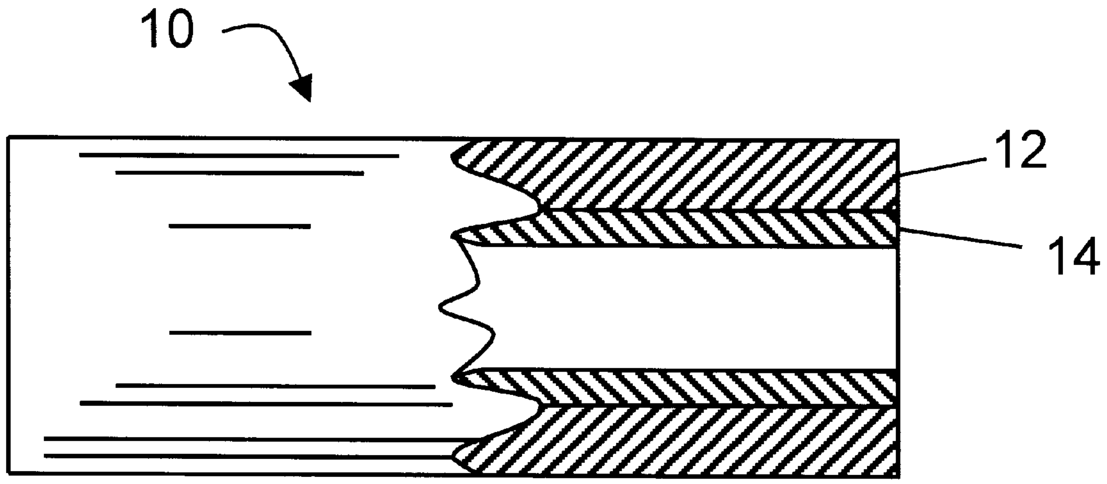
FIG. 1 is a front elevation, side view, partly broken away, showing a segment of a reactor tube for use in a thermal cracking furnace in accordance with the invention.

FIG. 1 is a front elevation, side view, partly broken away, showing a segment 10 of a reactor tube for use in a thermal cracking furnace in accordance with the invention. Such a reactor tube may be up to twelve meters (40 feet) in length. It may have a diameter as small as 2.5 cm. (1 inch), or as large as 20 cm. (8 inches). Segment 10 comprises a cast alloy tube 12 having a coating 14 formed on its inner surface.

It will be appreciated that a thermal cracking furnace will comprise a serpentine array of tubes and fittings, such as elbows, or it may be parallel, manifolded, straight tubes. It is contemplated that a complete cracking furnace, including reactor tubes and fittings, will be coated in accordance with the invention. However, short lengths of tubing may be coated and joined, as by welding.

Coating 14, in accordance with the invention, is an all-ceramic composition. It forms a seamless interface between the surface of a metal article, such as reactor tube 12, and the coating to provide coking resistance and thermal stability. This all-ceramic coating is based on the magnesia-chromate ($MgO.Cr_2O_3$) system. This coating will have at least one layer of reaction-formed, oxide coating. However, multiple coatings may be developed depending upon the coating performance needed in terms of such factors as coking resistance, corrosion resistance, and thermal expansion coefficients. The reaction-formed, ceramic coating prevents coke formations. It also can improve tubing erosion resistance during a thermal cracking process.

Figure 2:
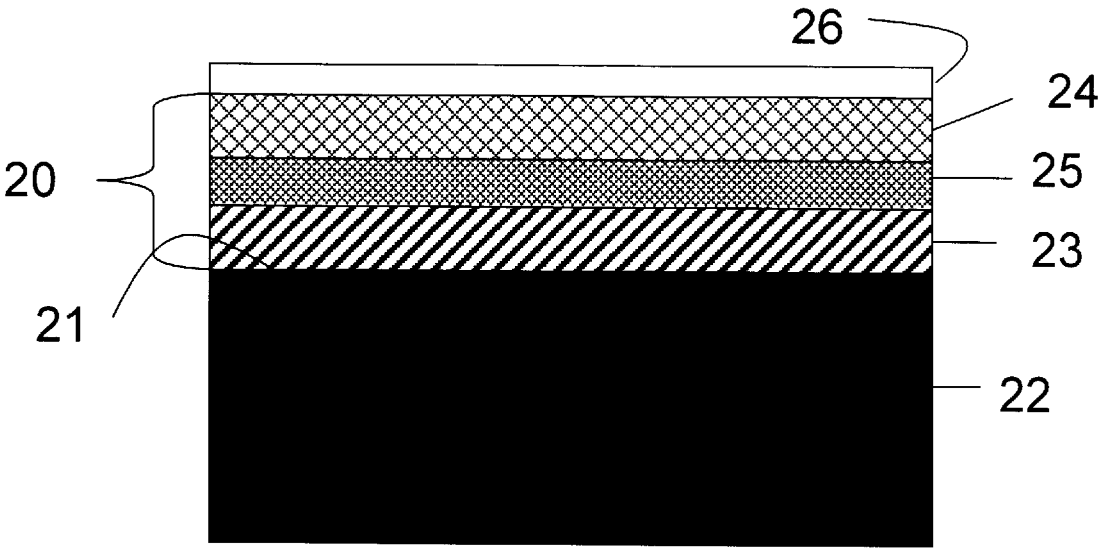
FIG. 2 is a cross-sectional view of a three-layer coating in accordance with the invention.

FIG. 2 is a cross-sectional view showing a three-layer coating 20 formed on the surface 21 of a chromium-containing metal alloy 22. Alloy 22 may, for example, be a high temperature alloy, available under the designation HP-45, that is commonly used in thermal cracking furnace components. The HP-45 alloy contains 37% Fe, 35% Ni and 27% Cr.

Additionally, a layer of chromia ($Cr_2O_3$) 23 is formed on the surface of alloy 22. Conveniently, $Cr_2O_3$ layer 23 may be produced by firing surface 21 of alloy 22 in an oxidizing atmosphere. The thickness of $Cr_2O_3$ layer 23 can be controlled by controlling oxidation conditions that include the oxidizing agent and the reaction time and temperature. Under thermal influence, chromium in the alloy tends to diffuse to the alloy surface and become oxidized as is well known.

Chromia layer 23 covers metal surface 21 completely and seamlessly. It may be developed to the degree of increasing the surface roughness through formation of chromia whiskers. These can improve adhesion between the chromate layer and subsequent, outer, oxide layers.

A layer of MgO 24, or an MgO precursor such as magnesium acetate, is deposited over $Cr_2O_3$ layer 23. MgO layer 24 may be applied by any conventional means, such as by spraying a MgO-containing slurry over $Cr_2O_3$ layer 23. Because of its weak basic property, MgO is strongly resistant to coking. However, it cannot be employed directly because its high melting temperature (about 2800° C.) far exceeds the melting point of the tube metal. Therefore, MgO has to be modified with additives to reduce its melting temperature from 2800° C. to less than 1200° C.

It has been found that when the dual layer of $Cr_2O_3$ and MgO is fired at temperatures up to about 1200° C., the two oxides form an intermediate layer 25. Layer 25 may be a $MgO.Cr_2O_3$ solid solution, or a spinel, $MgCr_2O_4$ structure, as shown in FIG. 262 of a publication *Journal American Ceramic Society*, 47(1) 30 (1964). This serves as a bond that holds the MgO layer in place. The broad range of the $MgO.Cr_2O_3$ formation system permits control of layer 25. The thickness of the layer is dependent on the extent of mixed oxide formation, which, in turn, is dependent on the time and temperature of the interaction.

The reaction between $Cr_2O_3$ and MgO tends to proceed slowly. Therefore, it is desirable to incorporate one or more additives with the MgO layer to facilitate reduction of the melting temperature to a value below 1200° C. This permits producing a dense, coating layer at or below this temperature.

Such additives may also provide, or improve, appropriate physical properties for the final coating. These properties include thermal expansion coefficient, surface hardness, coking resistance, and chemical resistance. For example, incorporation of silica, alumina, or other oxides with MgO can modify the thermal expansion coefficient of a material in the $MgO.Cr_2O_3$ mixed oxide system.

It will be understood that reference, both in the text and in the claims, to MgO, or to a $MgO.Cr_2O_3$ system, includes the oxide or system, either alone or in combination with further additives as identified herein for such purposes. Additives, especially suitable for inclusion with MgO, include, individually or in combination, oxides of the alkali metals, the alkaline earth metals, aluminum, silicon, boron, phosphorus, germanium, gallium, transitional metals, and rare-earth metals and their precursor compounds or minerals. Oxides of transition metals include oxides of copper, nickel, iron, zinc, cobalt, molybdenum, and tungsten. Oxides of rare-earth metals include oxides of lanthanum, cerium, and praesodymium. Particularly useful are oxides that can form homogeneous and stable structure(s) with MgO and/or $Cr_2O_3$ under processing chemical environment and conditions. Most typical of the oxides for high temperature service are those consisting essentially of Group IIA, Group IIIA, Group IVA, and Group VA oxides. Group IIIA and IV oxides are preferred. Especially preferred are $B_2O_3$, $Al_2O_3$, $SiO_2$, $Ga_2O_3$, and $GeO_2$.

The additives, either as the oxide or as an oxide precursor, may be mixed with MgO or a MgO precursor for application. For example, either the oxides or their precursors may be finely divided to permit forming a homogeneous mixture. This is then mixed with a vehicle to form a slurry which is applied, dried and fired. A porous coating that permits oxygen permeation is thus produced. This is necessary if a preliminary layer of oxidized chromium has not been provided. The formation of such preliminary $Cr_2O_3$ layer is generally preferable however.

Figure 3:
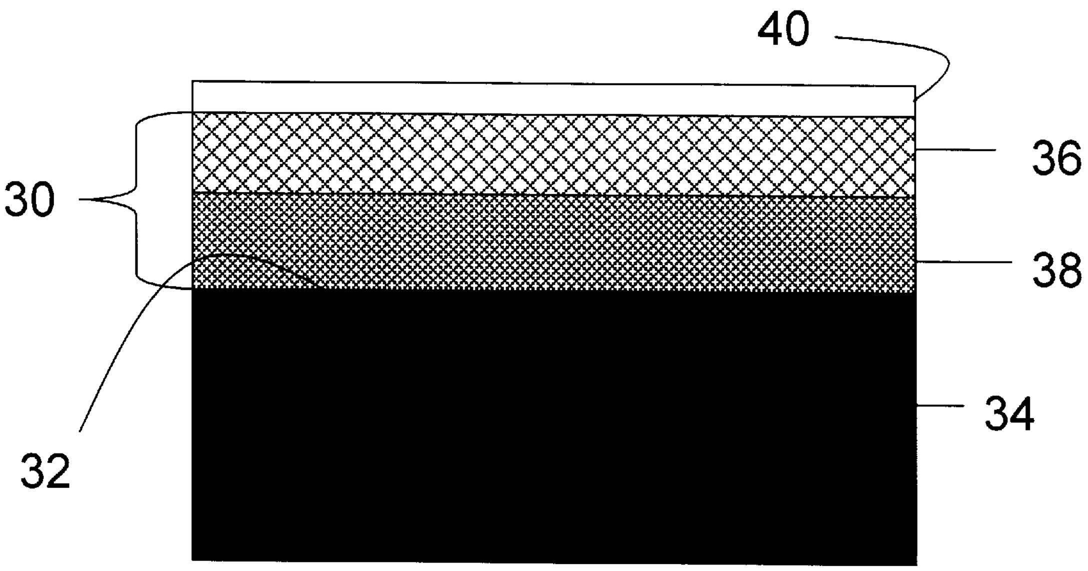
FIG. 3 is a cross-sectional view of a two-layer coating in accordance with the invention.

FIG. 3 is a cross-sectional, side view of two-layer coating 30 formed on the surface 32 of a chromium-containing alloy 34. Coating 30 corresponds to coating 20 of FIG. 2 with the $Cr_2O_3$ layer 23 omitted.

In producing coating 30, a porous layer of MgO 36, or a MgO precursor, is applied directly to surface 32 of alloy 34. This combination is heated to a temperature of 1000–1200° C. in an oxidizing atmosphere. This causes chromium to diffuse to the surface 32 where it becomes oxidized to $Cr_2O_3$. The necessary oxygen penetrates through the MgO layer. The $Cr_2O_3$ that forms combines with MgO, as described with reference to FIG. 2. This forms layer 38 of $MgO . Cr_2O_3$ solid solution, $MgCr_2O_4$ spinel, or a mixture of these compounds.

It has been observed that the rapid sweep of a hydrocarbon stream in a thermal cracking furnace has a tendency to erode metal from the bare inner wall of the reactor tubes. Each of the coating structures 20 and 30 of FIGS. 2 and 3 may have an erosion-resistant coating 26, 40 applied over the outer layer of MgO in each structure. Coatings of silicon carbide (SiC), or titanium nitride (TiN) have been found to be particularly effective materials for this purpose.

The invention is further described with reference to the following specific examples which are illustrative, but not limiting.

EXAMPLE 1

Three oxide precursors, $Mg(NO_3)_2$, $Zn(NO_3)_2$ and $H_3BO_3$ supplied by Aldrich Chemical Company in analytical grade, were employed. These were mixed in proportional amounts to yield a composition of 25% MgO+58% $B_2O_3$+17% ZnO by weight percent. The mixture was dissolved in distilled water. While being magnetically stirred, the aqueous mixture was heated to 100° C. This vaporized water from the solution and formed a uniform, solid, body of material. The solid body was transferred to a ceramic crucible and heated in air to 450° C. It was held at that temperature for twenty-four hours to convert the nitrate precursors to their corresponding oxides. The resultant, oxide mixture was further heated in air to 600° C. for an additional two hours to complete conversion of the salts into oxides. After grinding to a powder form, the oxide mixture was pressed into buttons (about 0.5 cm diameter by 0.5 cm height). The pressed buttons were heated in air to 1100° C. It was evident that the mixture was melted at this temperature as shown by good flow in the button samples. XRD results showed mixed crystal phases of magnesium and zinc boronates in the samples thus produced.

EXAMPLE 2

In this example, the three oxide precursors of Example 1, instead of being dissolved in distilled water, were physically mixed in proportional amounts to yield a composition of 25% MgO+58% $B_2O_3$+17% ZnO by weight percent. The mixture was stirred manually for about ten minutes to provide a uniform mixture, and then transferred to a ceramic crucible. The mixture was heated in air to 450° C. and held at that temperature for twenty-four hours. This converted the nitrate precursors into their corresponding oxides. The resultant oxide mixture was further heated in air to 600° C. for an additional two hours to complete the conversion into oxides in a powder form. The powder was pressed into button size samples (about 0.5 cm diameter by 0.5 cm height). The pressed buttons were heated in air to 1100° C. Again, the mixture was found to be melted at this temperature as shown by good flow. XRD results showed mixed crystal phases of magnesium and zinc boronates as in Example 1.

EXAMPLE 3

The purpose of this example was to demonstrate the effectiveness of other precursors than nitrates and boric acid. Following the procedure described in Example 2, $Mg(CH_3COO)_2$, $Zn(CH_3COO)_2$ and $B_2O_3$, again supplied by Aldrich Chemical Company in analytical grade, were physically mixed in proportional amounts to result in 25% MgO+58% $B_2O_3$+17% ZnO by weight percent. After firing at different stages, as in Example 2, the oxide mixture thus produced was melted at the 1100° C. temperature with good flow. XRD results showed the same mixed crystal phases of magnesium and zinc boronates as illustrated in Examples 1 and 2.

EXAMPLE 4

In this example, batch materials were compounded as in Example 2, automatically tumble-mixed in order to achieve a homogeneous melt, and thereafter placed into platinum crucibles. The crucibles were then covered, placed into a furnace operating at a temperature of about 1500° C. for approximately three hours. Very little volatilization of $B_2O_3$, or any other species, was noted during melting. The melts were then poured into a steel mold to form rectangular, ceramic slabs exhibiting dimensions of approximately 15×10×1.25 cms. (6×4×0.5 inches). The slabs were subsequently placed into an annealer operating at approximately 500° C. Immediately thereafter, they were allowed to cool to room temperature at the furnace rate. XRD measurements on the resultant ceramic slabs showed the same crystal phases as described in Examples 1–3.

EXAMPLE 5

The ceramic materials produced in Examples 1–4 were ground to a mean particle size less than 15 microns. The ceramic particles thus produced were mixed with an organic binder of 97% amyl-acetate+3% nitrocellulose at a ratio of two parts ceramic to one part binder. The viscosity of the resultant slurry was less than 1500 cp. The slurry mixture was coated on 2.5 cm×2.5 cm (1 in×1 in), HP-45 alloy coupons by spraying under air pressure of 10–60 psi. The coated coupons were fired in air from ambient temperature to 1200° C. at 300° C./hr. and held at 1200° C. for four hours. A smooth and defect-free coating layer with a thickness of 0.1–0.15 mm was formed on the coupons.

The coated coupons were subjected to a coking experiment at 850° C. In this experiment, the coated coupons were placed in a tubular furnace operating at a temperature of 850° C., and held at that temperature for six (6) hours. Meanwhile, a gaseous stream, composed of ethane and steam, and designed to simulate a thermal cracking furnace operation, was passed through the furnace and over the coated coupons. The stream was under pressure designed to provide a residence time of about one second.

The coated samples were cooled at furnace rate following the six-hour treatment. When examined, no apparent damage to, or loss of, coating was observed. This indicated good adhesion of the coating, and no serious erosion.

In addition to the specific, oxide composition employed in Examples 1–5, numerous other compositions have been prepared from a combination of precursor salts in similar manner and tested. In one series, the 25% MgO–58% $B_2O_3$–17% ZnO composition was modified by substituting 17% of each of the following oxides for ZnO: $Cr_2O_3$, NiO, $Fe_2O_3$, $Al_2O_3$, $SiO_2$, CaO, $La_2O_3$ and $P_2O_5$. The substitutions were made by employing a compatible precursor salt in the original mixture, e.g. calcium or aluminum nitrate for zinc nitrate.

A further series was prepared by duplicating the modified series just described, except for a still further substitution. In this series, 28% $P_2O_5$ was substituted for 28% $B_2O_3$. This produced a series of compositions, ultimately composed of 25% MgO+30% $B_2O_3$+28% $P_2O_5$+17% MO, where MO was $Cr_2O_3$, $La_2O_3$, CaO, ZnO, $Fe_2O_3$, NiO, or $Al_2O_3$. Thus, a very wide variety of oxide mixtures based on MgO and $B_2O_3$ are available for use in accordance with the invention.

We claim:

1. A method of protecting a metal article, the surface of which is exposed to deposition of carbon, which comprises producing an adherent, seamless coating on the metal surface, the coating comprising a ceramic layer of combined metal oxides within the $MgO.Cr_2O_3$ system.

2. A method in accordance with claim 1 wherein the layer of combined metal oxides includes one or more metal oxides selected from the group consisting of alkali metals, alkaline earth metal, aluminum, silicon, boron, phosphorus, germanium, gallium, transition metal and rare earth metal oxides.

3. A method in accordance with claim 1 which comprises producing a coating within the $MgO.Cr_2O_3$ system that is a $MgO.Cr_2O_3$ solid solution, or a $MgCr_2O_4$ spinel, or a mixture thereof, and which may optionally include one or more metal oxides selected from the group consisting of alkali metal, alkaline earth metal, aluminum, silicon, boron, phosphorus, germanium, gallium, transition metal and rare earth metal oxides.

4. A method in accordance with claim 1 which comprises producing a layer of $Cr_2O_3$ on the metal surface, applying a layer of a source of MgO alone or in combination with a source of one or more metal oxides selected from the group consisting of alkali metal, alkaline earth metal, aluminum, silicon, boron, phosphorus, germanium, gallium, transition metal and rare earth metal oxides, over the layer of $Cr_2O_3$ and heat treating the dual-coated metal surface to produce a layer of combined oxides within the $MgO.Cr_2O_3$ system.

5. A method in accordance with claim 4 which comprises providing a chromium-containing alloy, heat treating the alloy in an oxidizing atmosphere to diffuse chromium to the surface and to form a $Cr_2O_3$ layer by oxidation, coating the $Cr_2O_3$ layer with a source of MgO or MgO in combination with a source of one or more metal oxides selected from the group consisting of alkali metal, alkaline earth metal, aluminum, silicon, boron, phosphorus, germanium, gallium, transition metal and rare earth metal oxides, and heat treating the dual-coated metal surface to produce a layer of combined oxides within the $MgO.Cr_2O_3$ system.

6. A method in accordance with claim 1 which comprises providing a chromium-containing metal alloy, coating the surface of the alloy with a source of MgO or MgO in combination with a source of one or more metal oxides selected from the group consisting of alkali metal, alkaline earth metal, aluminum, silicon, boron, phosphorus, germanium, gallium, transition metal and rare earth metal oxides, and heat treating the coated metal alloy to form a layer of combined oxides within the $MgO.Cr_2O_3$ system.

7. A method in accordance with claim 1 which further comprises retaining a layer of MgO, or MgO in combination with a source of one or more metal oxides selected from the group consisting of alkali metal, alkaline earth metal, aluminum, silicon, boron, phosphorus, germanium, gallium, transition metal and rare earth metal oxides, on the layer of combined metal oxides within the $MgO.Cr_2O_3$ system.

8. A method in accordance with claim 7 which comprises depositing an erosion-resistant layer of SiC or TiN over the MgO containing layer.

9. A method of lessening the tendency for carbon to deposit on a metal surface when that surface is exposed, while heated, to a gaseous stream containing hydrocarbons during a thermal cracking process, the method comprising forming a thin, adherent, seamless coating on the metal surface prior to heating that surface and then contacting the coated surface with the hot, gaseous stream, the coating comprising a layer of combined metal oxides within the $MgO.Cr_2O_3$ system.

10. A method in accordance with claim 9 wherein the layer of combined metal oxides includes one or more metal oxides selected from the group consisting of alkali metal, alkaline earth metal, aluminum, silicon, boron, phosphorus, germanium, gallium, transition metal and rare earth metal oxides.

11. A method in accordance with claim 9 which comprises producing a coating that is composed of a $MgO.Cr_2O_3$ solid solution, or a $MgCr_2O_4$ spinel, or mixtures thereof, and which may optionally include one or more metal oxides selected from the group consisting of alkali metal, alkaline earth metal, aluminum, silicon, boron, phosphorus, germanium, gallium, transition metal and rare earth metal oxides.

12. A method in accordance with claim 9 which comprises providing a layer of MgO or MgO in combination with one or more metal oxides selected from the group consisting of alkali metal, alkaline earth metal, aluminum, silicon, boron, phosphorus, germanium, gallium; transition metal and rare earth metal oxides over the layer of combined oxides within the $MgO.Cr_2O_3$ system.

13. A method in accordance with claim 12 which comprises depositing an erosion-resistant coating of SiC or TiN over the MgO containing layer.

14. A method in accordance with claim 9 which comprises heat treating a chromium-containing metal alloy in an oxidizing atmosphere to diffuse chromium to the surface of the metal and to oxidize it to $Cr_2O_3$, and interacting the $Cr_2O_3$ with MgO to produce a layer of combined oxides in the $MgO.Cr_2O_3$ system.

15. A method in accordance with claim 9 which comprises applying a coating of a source of MgO, or MgO in combination with a source of one or more metal oxides selected from the group consisting of alkali metal, alkaline earth metal, aluminum, silicon, boron, phosphorus, germanium, gallium, transition metal and rare earth metal oxides, to the surface of the alloy, and, subsequently heat treating the coated alloy to form $Cr_2O_3$ that interacts with the MgO.

16. A method in accordance with claim 9 which comprises forming a layer of $Cr_2O_3$ on the alloy surface, applying a source of MgO or MgO in combination with a source of one or more metal oxides selected from the group consisting of alkali metal, alkaline earth metal, aluminum, silicon, boron, phosphorus, germanium, gallium, transition metal and rare earth metal oxides over the $Cr_2O_3$ layer and heat treating to interact the layers of $Cr_2O_3$ and MgO.

17. A furnace element for insertion in a furnace for thermally cracking or reforming hydrocarbons, the furnace element having an adherent, seamless coating that protects the surface of the furnace element against deposition of carbon, the coating comprising a layer of combined metal oxides within the $MgO.Cr_2O_3$ system.

18. A furnace element in accordance with claim 17 wherein the layer of combined metal oxides includes one or more metal oxides selected from the group consisting of alkali metal, alkaline earth metal, aluminum, silicon, boron, phosphorus, germanium, gallium, transition metal and rare earth metal oxides.

19. A furnace element in accordance with claim 17, the layer of combined oxides within the $MgO.Cr_2O_3$ system being composed of a $MgO.Cr_2O_3$ solid solution, or a $MgCr_2O_4$ spinel, or a mixture thereof, and which may optionally include one or more metal oxides selected from the group consisting of alkali metal, alkaline earth metal, aluminum, silicon, boron, phosphorus, germanium, gallium, transition metal and rare earth metal oxides.

20. A furnace element in accordance with claim 17 wherein the coating further comprises a layer of MgO or MgO in combination with one or more metal oxides selected from the group consisting of alkali metal, alkaline earth metal, aluminum, silicon, boron, phosphorus, germanium, gallium, transition metal and rare earth metal oxides over the layer of combined oxides within the $MgO.Cr_2O_3$ system.

21. A furnace element in accordance with claim 17 wherein the coating further comprises an erosion-resistant coating of SiC or TiN applied over the MgO layer.

22. A furnace element in accordance with claim 17 wherein the coating further comprises a layer of $Cr_2O_3$ formed on the metal surface and intermediate that surface and the layer of combined oxides within the MgO $Cr_2O_3$ system.

23. A furnace element in accordance with claim 17 in the form of a reactor tube, the coating being on the inside wall of the reactor tube.

24. A furnace element in accordance with claim 17 in the form of a fitting, the coating being on an inside wall of the fitting.

* * * * *